(12) United States Patent
Weiss et al.

(10) Patent No.: US 12,092,086 B2
(45) Date of Patent: Sep. 17, 2024

(54) GEOPRESSURE AND GEOTHERMAL POWER SYSTEM

(71) Applicant: Sage Geosystems Inc., Bellaire, TX (US)

(72) Inventors: Nathan Weiss, Bellaire, TX (US); Douglas Simpkins, Bellaire, TX (US); Lev M. Ring, Bellaire, TX (US); Robert Lance Cook, Bellaire, TX (US)

(73) Assignee: SAGE GEOSYSTEMS INC., Houston, TX (US)

( * ) Notice: Subject to any disclaimer, the term of this patent is extended or adjusted under 35 U.S.C. 154(b) by 0 days.

(21) Appl. No.: 18/264,651

(22) PCT Filed: Nov. 7, 2022

(86) PCT No.: PCT/US2022/079392
§ 371 (c)(1),
(2) Date: Aug. 8, 2023

(87) PCT Pub. No.: WO2023/081881
PCT Pub. Date: May 11, 2023

(65) Prior Publication Data
US 2024/0035452 A1    Feb. 1, 2024

Related U.S. Application Data

(60) Provisional application No. 63/276,638, filed on Nov. 7, 2021.

(51) Int. Cl.
*F03G 4/00*    (2006.01)
*F24T 10/20*    (2018.01)

(52) U.S. Cl.
CPC ............. *F03G 4/029* (2021.08); *F03G 4/001* (2021.08); *F24T 10/20* (2018.05)

(58) Field of Classification Search
CPC ........... F03G 4/029; F03G 4/001; F24T 10/20
(Continued)

(56) References Cited

U.S. PATENT DOCUMENTS 5,311,741 A * 5/1994 Blaize ..................... F24T 10/20
60/676
5,598,706 A * 2/1997 Bronicki ................... F03G 7/04
60/641.2

(Continued)

FOREIGN PATENT DOCUMENTS

EP    1315554 A1    6/2003
EP    2916927 B1    12/2018

(Continued)

OTHER PUBLICATIONS

International Search Report and Written Opinion for PCT/US2022/079392 filed Nov. 4, 2022, mailed Mar. 7, 2023, 10 pgs.

(Continued)

*Primary Examiner* — Hoang M Nguyen
(74) *Attorney, Agent, or Firm* — Patterson + Sheridan, LLP (57) ABSTRACT

A geopressure and geothermal power system includes at least one pressure exchanger configured to receive a production fluid and a working fluid. At least one power generation unit is fluidly coupled to the pressure exchanger. At least one production well is positioned at least partially within a geothermal reservoir and provides the production fluid to the pressure exchanger. The system may also include at least one heat exchanger fluidly coupled to the at least one pressure exchanger and configured to one of, a) receive from and b) provide to, the at least one pressure exchanger the production fluid and the working fluid.

15 Claims, 4 Drawing Sheets

(58) Field of Classification Search
USPC .............................................. 60/641.2–641.4
See application file for complete search history.

(56) References Cited

U.S. PATENT DOCUMENTS

| | | | |
|---|---|---|---|
| 5,671,601 A * | 9/1997 | Bronicki | ................. F24T 10/20 |
| | | | 60/641.5 |
| 5,988,993 A | 11/1999 | Hauge | |
| 8,795,525 B2 | 8/2014 | McGinnis | |
| 10,731,702 B2 | 8/2020 | Thatte | |
| 2010/0045042 A1 | 2/2010 | Hinders | |
| 2014/0070544 A1* | 3/2014 | Bronicki | .............. H02K 7/1823 |
| | | | 290/40 B |
| 2019/0390576 A1 | 12/2019 | Thatte | |
| 2022/0397310 A1 | 12/2022 | Thatte et al. | |
| 2023/0107529 A1 | 4/2023 | Madsen et al. | |

FOREIGN PATENT DOCUMENTS

| | | | |
|---|---|---|---|
| JP | 2016211527 A | 12/2016 | |
| JP | 2020128726 A | 8/2020 | |
| WO | 2019011991 A1 | 1/2019 | |

OTHER PUBLICATIONS

Corrected International Search Report for PCT/US2022/079392 filed Nov. 4, 2022, mailed Mar. 7, 2023, 4 pgs.
Corrected Written Opinion for PCT/US2022/079392 filed Nov. 4, 2022, mailed Mar. 7, 2023, 4 pgs.
PCT International Search Report and Written Opinion dated Jul. 30, 2024, for International Application No. PCT/US2024/025455.

\* cited by examiner

GEOPRESSURE AND GEOTHERMAL POWER SYSTEM

REFERENCE TO EARLIER FILED APPLICATIONS

The present application is an International Patent Application under the Patent Cooperation Treaty and claims priority to and the benefit of U.S. Provisional Patent Application Ser. No. 63/276,638 filed Nov. 7, 2021 and titled Geopressure and Geothermal Power System, the disclosure of which is incorporated in its entirety by this reference.

BACKGROUND

The present application relates to downhole heat exchangers for use in geothermal power systems and, more specifically, the arrangement of downhole pipe and the direction of flow of fluids in those pipes to form a downhole heat exchanger.

Geothermal energy is a type of renewable energy generated within the earth. While it may be used directly for heating, it can also be transformed into electricity, typically through the use of surface turbines. Geothermal power produces relatively little carbon dioxide or other pollutants that contribute to global climate change and may reduce the reliance upon fossil fuels.

Historically, geothermal energy and production has centered around areas of the Earth with higher-than-normal temperature rocks are found relatively nearer to the surface. The regional nature of these resources limits the potential growth of geothermal power.

Further, the efficiency of geothermal power systems is directly a function of the amount of heat that can be transferred from below the Earth's surface—typically via a carrier medium, such as water and/or other fluids—and the change of temperature that carrier medium undergoes at the surface.

The efficiency of present geothermal systems typically is less than 10 percent. In other words, less than 10 percent of the available energy is usefully converted into electricity. The cost of producing geothermal power, then, could be significantly reduced and the ability to use medium to low temperature geothermal sources could be made available, if the efficiency of the entire geothermal power system is improved.

BRIEF SUMMARY

A geopressure and geothermal power system may include at least one pressure exchanger configured to receive a production fluid and a working fluid. Optionally, the geopressure and geothermal power system may include at least one heat exchanger fluidly coupled to the at least one pressure exchanger and configured to one of, a) receive from and b) provide to, the at least one pressure exchanger the production fluid and the working fluid.

The geopressure and geothermal power system may also include at least one power generation unit fluidly coupled to one of the at least one pressure exchanger and the at least one heat exchanger. The at least one power generation unit may include at least one of an expander, a gearbox, and a generator. The at least one power generation unit may be configured to receive the working fluid after the working fluid has passed through the at least one pressure exchanger and the at least one heat exchanger.

At least one production well may be positioned at least partially within a geothermal reservoir and configured to provide the production fluid to at least one of the at least one pressure exchanger and the at least one heat exchanger.

Optionally, the at least one pressure exchanger may be configured to receive the production fluid at an inlet production fluid pressure and to receive the working fluid at an inlet working fluid pressure. The at least one pressure exchanger may be configured to provide the production fluid at an outlet production fluid pressure lower than the inlet production fluid pressure and to provide the working fluid at an outlet working fluid pressure higher than the inlet working fluid pressure. Optionally, the at least one pressure exchanger may be positioned fluidly upstream of the at least one heat exchanger. The at least one pressure exchanger may comprise a plurality of pressure exchangers.

Optionally, the at least one heat exchanger may be configured to receive the production fluid at an inlet production fluid temperature and to receive the working fluid at an inlet working fluid temperature. The at least one heat exchanger may be configured to provide the production fluid at an outlet production fluid temperature lower than the inlet production fluid temperature and to provide the working fluid at an outlet working fluid temperature higher than the inlet working fluid temperature. The at least one heat exchanger may comprise a plurality of heat exchangers. The at least one heat exchanger may comprise any type of heat exchanger, including a counter-current heat exchanger, a cocurrent heat exchanger, and so forth. In some instances, the at least one heat exchanger may include a downhole heat exchanger positioned in a production well.

The geopressure and geothermal power system may also include at least one boost pump configured to increase at least one of a production fluid pressure and a production fluid flow rate of the production fluid. The at least one boost pump may be fluidly coupled to and positioned fluidly upstream from one of the at least one pressure exchanger and the at least one heat exchanger. The at least one boost pump may be an electric submersible pump positioned in the at least one production well.

Optionally, the geopressure and geothermal power system may also include at least one boost pump configured to increase at least one of an injection fluid pressure and an injection fluid flow rate of the production fluid before the production fluid is reinjected into the geothermal reservoir.

Optionally, the route or conduit through which the production fluid passes may be configured so as to reinject the injection fluid into the geothermal reservoir after the production fluid has passed through at least one of the at least one pressure exchanger and the at least one heat exchanger.

The geopressure and geothermal power system may use a production fluid of any type, including fresh water, brine, ammonia, benzene, other hydrocarbons, organic compounds, other liquids, other gases, and the like. Fluid is defined to include both liquids, gases, and supercritical fluids.

The geopressure and geothermal power system may use a working fluid of any type, including fresh water, brine, ammonia, benzene, other hydrocarbons, organic compounds, other liquids, other gases, and the like. Fluid is defined to include both liquids, gases, and supercritical fluids, such as supercritical carbon dioxide.

Another example of a geopressure and geothermal power system may include a least one pressure exchanger configured to receive a production fluid and a working fluid, at least one power generation unit fluidly coupled to the at least one pressure exchanger, and at least one production well positioned at least partially within a geothermal reservoir and configured to provide the production fluid to the at least one pressure exchanger. At least one heat exchanger may be fluidly coupled to the at least one pressure exchanger and configured to one of, a) receive from and b) provide to, the at least one pressure exchanger the production fluid and the working fluid.

A method of converting geopressured and geothermal energy into electricity with a geothermal power system may include producing the production fluid from at least one production well of claim; introducing the production fluid and the working fluid into the at least one pressure exchanger; and increasing an inlet working fluid pressure of the working fluid.

The method may also include introducing the production fluid and the working fluid into the at least one heat exchanger and increasing an inlet working fluid temperature of the working fluid. Optionally, this step of introducing the production fluid and the working fluid into the at least one heat exchanger may occur before introducing the production fluid and the working fluid into the at least one pressure exchanger.

The method may also include introducing the working fluid into the at least one power generation unit and generating electricity with the at least one power generation unit.

The method may also include reinjecting the production fluid into the geothermal reservoir. Optionally, the method may include increasing at least one of an injection fluid pressure and an injection fluid flow rate of the production fluid before reinjecting the production fluid into the geothermal reservoir.

The method may include increasing at least one of a production fluid pressure and a production fluid flow rate of the production fluid before introducing the production fluid into the at least one pressure exchanger.

As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Various embodiments of the present inventions are set forth in the attached figures and in the Detailed Description as provided herein and as embodied by the claims. It should be understood, however, that this Summary does not contain all of the aspects and embodiments of the one or more present inventions, is not meant to be limiting or restrictive in any manner, and that the invention(s) as disclosed herein is/are and will be understood by those of ordinary skill in the art to encompass obvious improvements and modifications thereto.

Additional advantages of the present invention will become readily apparent from the following discussion, particularly when taken together with the accompanying drawings.

BRIEF DESCRIPTION OF THE DRAWINGS

To further clarify the above and other advantages and features of the one or more present inventions, reference to specific embodiments thereof are illustrated in the appended drawings. The drawings depict only typical embodiments and are therefore not to be considered limiting. One or more embodiments will be described and explained with additional specificity and detail through the use of the accompanying drawings in which.

Common element numbers represent common features, even if the appearance of a feature varies slightly between the figures.

The drawings are not necessarily to scale.

DETAILED DESCRIPTION

The present invention will now be further described. In the following passages, different aspects of the embodiments of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Figure 1:
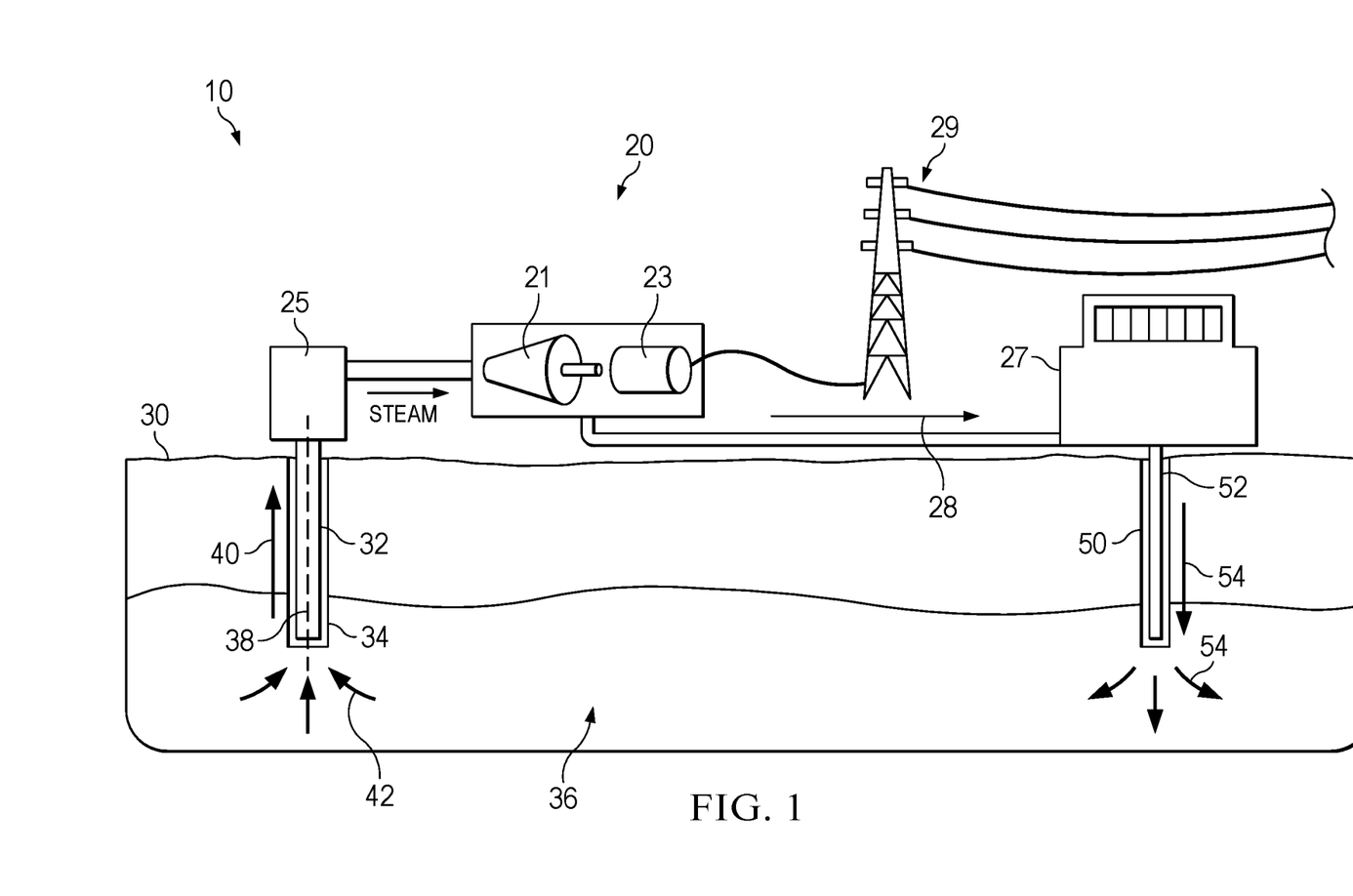
FIG. 1 is a geothermal power system coupled to an embodiment of a downhole heat exchanger.

An idealized geothermal power system 10 includes a power generation unit 20 located on the Earth's surface 30 as illustrated in FIG. 1. The power generation unit 20 may be of any type that converts heat to electricity and may include any one or more of a turbine 21, generator 23, expansion unit 25, cooling unit 27 to receive the relatively cooler steam and/or water 28 from the turbine 21, and electricity transmission system 29. Some examples of representative power generation units include direct dry steam plants, flash plants, binary plants, combined-cycle or hybrid plants, and so forth, that receive heated fluid from surface or subsurface sources of heat. The power generation units may operate on a Rankine Cycle (RC), Brayton Cycle, and combinations or variations of these cycles and other known thermodynamic cycles.

The geothermal power system 10 also includes at least one tubing 32 that is configured to be positioned within a wellbore 34, the wellbore 34, in turn, being positioned in a subterranean geothermal source 36 or reservoir to return heated water or other heated production fluid 40 (including gases, liquids, and supercritical fluids such as supercritical carbon dioxide) that is heated via direct or indirect contact with any rock and/or fluid 42 in the geothermal source 36. Additionally, or alternatively, the at least one tubing 32 may be positioned within or along a source of heat on the surface. The at least one tubing is hydraulically coupled to the power generation unit 20. The at least one tubing includes a longitudinal axis 38.

The following disclosure may be used, in part or in whole or in any combination of elements with, any one or more of International Patent Application No. PCT/US2022/036552 entitled Thermally Insulated Tubing for Geothermal Power Systems and filed Jul. 8, 2022 and U.S. Provisional Patent Application 63/220,109 entitled Thermally Insulated Tubing for Geothermal Power Systems filed Jul. 9, 2021; International Patent Application No. PCT/US2022/044736 entitled Downhole Heat Exchanger for Geothermal Power Systems and filed Sep. 26, 2022 and U.S. Provisional Patent Application 63/248,965 for a Downhole Heat Exchanger for Geothermal Power Systems filed Sep. 27, 2021; Azam Thane, A New Type of Rotary Liquid Piston Pump for Multi-Phase CO2 Compression, Proceedings of ASME Turbo Expo 2018, GT2018-77011 (Jun. 11-15, 2018, Oslo, Norway); U.S. Pat. No. 5,988,993 entitled Pressure Exchanger Having a Rotor With Automatic Axial Alignment that issued Nov. 23, 1999; and U.S. Pat. No. 10,731,702 entitled System and Method for Hybrid Hydrodynamic-Hydrostatic Thrust Bearings that issued Aug. 4, 2020, the disclosures of each of which are fully incorporated by this reference.

Figure 2:
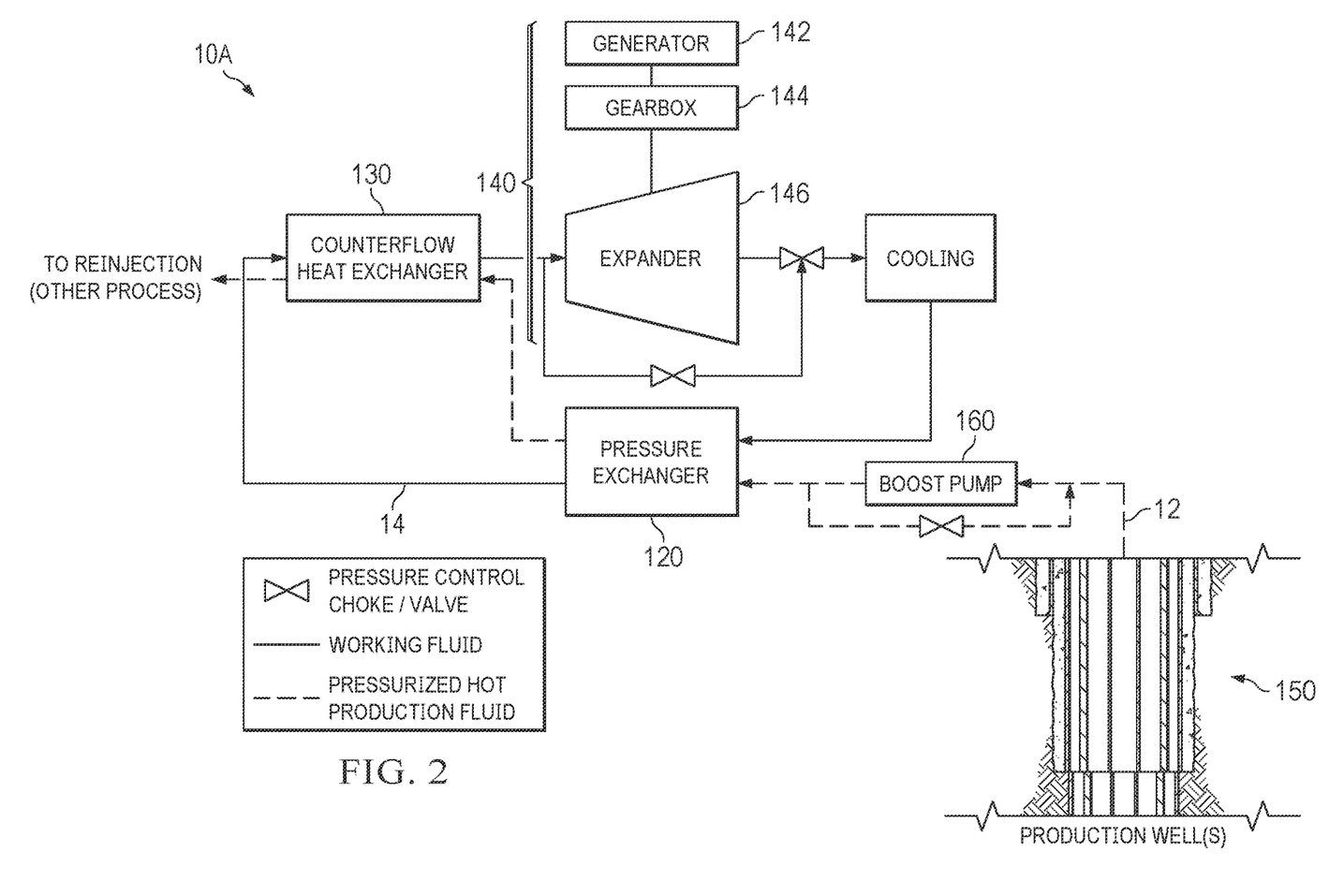
FIG. 2 is a schematic of an embodiment of geopressure and geothermal power system.
Figure 3:
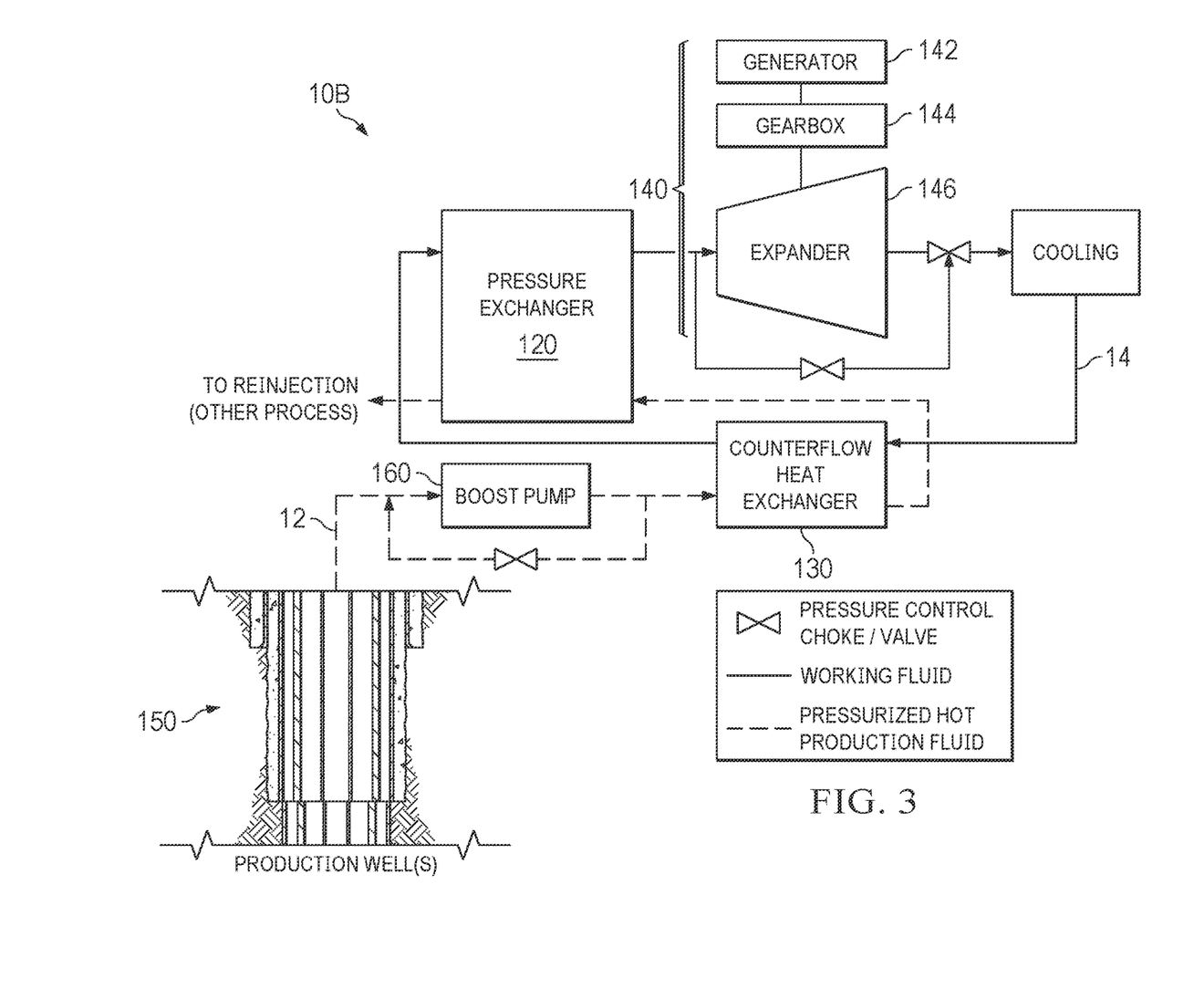
FIG. 3 is a schematic of the embodiment of the geopressure and geothermal power system of FIG. 2 in which the order of a pressure exchanger and a heat exchanger are reversed.
Figure 4:
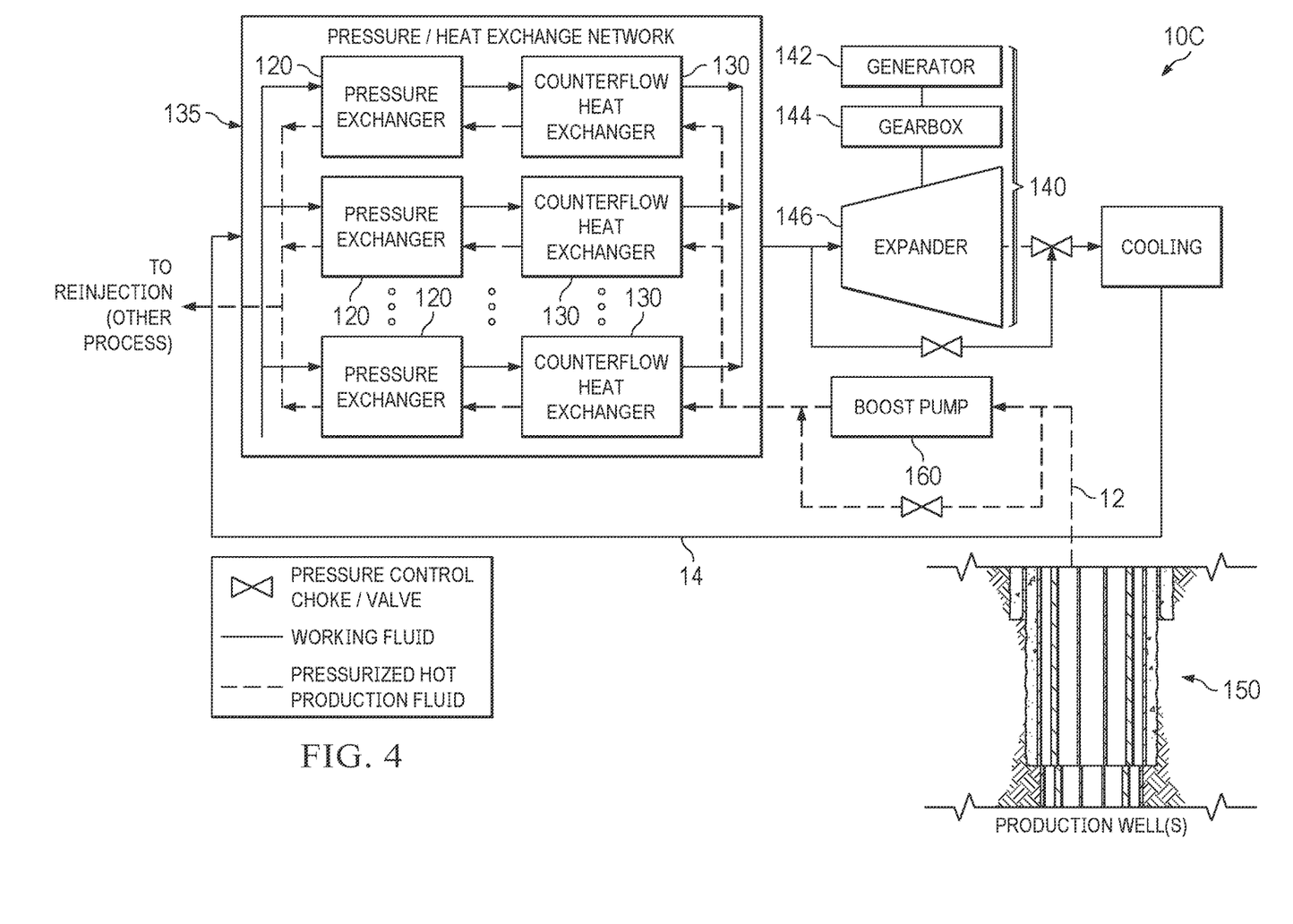
FIG. 4 is a schematic of the embodiment of the geopressure and geothermal power system of FIG. 2 in which a plurality of pressure exchangers and a plurality of heat exchangers are disclosed.

FIGS. 2 through 4 illustrate variations of a geopressure and geothermal power systems 10A, 10B, and 10C with common components identically numbered, although the particular order or location of the components may vary slightly. Further, any components (valves, etc.) may be used interchangeably or alternatively in any combination with other elements of the power systems 10A, 10B, and 10C.

The power system 10A, 10B, and 10C optionally includes at least one power generation unit 140 of any type of power generation unit 20 discussed above with respect to FIG. 1. The power generation unit 140 may be fluidly coupled to one of the pressure exchanger(s) 120 (FIG. 3) and/or the heat exchanger(s) 130 (FIGS. 2 and 4). The at least one power generation unit 140 may be configured to receive the working fluid 14 after the working fluid 14 has passed through the pressure exchanger(s) 120 and/or the heat exchanger(s) 130. The working fluid 14 is the isolated working fluid within the power system 10B, and 10C, and may be of any type of working fluid typically used for heat exchangers in conjunction with power systems, including fresh water, steam, ammonia, benzene, other hydrocarbons, organic compounds, other liquids, other gases, and the like. Fluid is defined to include both liquids, gases, and supercritical fluids. A supercritical fluid is any substance at a temperature and pressure above its critical point where distinct liquid and gas phases do not exist, but below the pressure at which the substance becomes a solid. Optionally, the working fluid 14 may be supercritical water, supercritical carbon dioxide, supercritical ammonia, and/or other supercritical fluids.

To be precise, the working fluid 14 is distinguished from the production fluid 12, which may be identical to the production fluid 40 discussed above with respect to FIG. 1. The production fluid 12 may include wholly or in part produced fluid from the geothermal reservoir 36 and/or it may comprise, in whole or part, a production fluid that is intermingled with the produced fluid or kept wholly separate from the produced fluid. The production fluid 12 may be of any type, including fresh water, brine (typically greater than 2 parts per thousand of dissolved salt, typically sodium and chloride, but other salts are included in this definition), ammonia, benzene, other hydrocarbons, organic compounds, other liquids, other gases, and the like. Fluid is defined to include both liquids, gases, and supercritical fluids. A supercritical fluid is any substance at a temperature and pressure above its critical point where distinct liquid and gas phases do not exist, but below the pressure at which the substance becomes a solid. Optionally, the production fluid 12 may be supercritical water, supercritical carbon dioxide, supercritical ammonia, and/or other supercritical fluids.

The power generation unit 140 may include one or more of an expander 146, a gearbox 144, and a generator 142 in any combination or physical arrangement.

The power system 10A, 10B, and 10C may include and optionally be fluidly coupled to at least one production well 150, although a plurality of production wells 150 (not illustrated) may be employed with a power system. The at least one production well 150 may be a wellbore 34 and/or a wellbore 34 as described in International Patent Application No. PCT/US2022/044736 entitled Downhole Heat Exchanger for Geothermal Power Systems and filed Sep. 26, 2022 and U.S. Provisional Patent Application 63/248,965 for a Downhole Heat Exchanger for Geothermal Power Systems filed Sep. 27, 2021, the disclosures of which are incorporated herein by reference. The at least one production well 150 is positioned at least partially within a geothermal reservoir or geothermal source (not illustrated, although indicated at 36 in FIG. 1) and is configured to provide the production fluid 40 to one of the pressure exchanger(s) 120 and/or the heat exchanger(s) 130.

The at least one production well 150 may transport the production fluid 12 in any type of conduit, tubing, or pipe to and through the power system 10A, 10B, and 10C. One type of conduit that may be suitable for a portion or all of the conduit are disclosed in International Patent Application No. PCT/US2022/036552 entitled Thermally Insulated Tubing for Geothermal Power Systems and filed Jul. 8, 2022 and U.S. Provisional Patent Application 63/220,109 entitled Thermally Insulated Tubing for Geothermal Power Systems filed Jul. 9, 2021, which are incorporated by this reference.

The working fluid 14 likewise may transported to and through the power system 10B, and 10C. One type of conduit that may be suitable for a portion or all of the conduit are disclosed in International Patent Application No. PCT/US2022/036552 entitled Thermally Insulated Tubing for Geothermal Power Systems and filed Jul. 8, 2022 and U.S. Provisional Patent Application 63/220,109 entitled Thermally Insulated Tubing for Geothermal Power Systems filed Jul. 9, 2021, which are incorporated by this reference.

The power systems 10A, 10B, and 10C include at least one pressure exchanger 120 configured to receive a production fluid 12 and/or a working fluid 14. The pressure exchanger 120 may be of any type or combination as disclosed in Azam Thane, A New Type of Rotary Liquid Piston Pump for Multi-Phase CO2 Compression, Proceedings of ASME Turbo Expo 2018, GT2018-77011 (Jun. 11-15, 2018, Oslo, Norway); U.S. Pat. No. 5,988,993 entitled Pressure Exchanger Having a Rotor With Automatic Axial Alignment that issued Nov. 23, 1999; and U.S. Pat. No. 10,731,702 entitled System and Method for Hybrid Hydrodynamic-Hydrostatic Thrust Bearings that issued Aug. 4, 2020, which are incorporated here by reference.

The pressure exchanger 120 optionally is configured to receive the production fluid 12 at an inlet production fluid pressure and to receive the working fluid 14 at an inlet working fluid pressure. The pressure exchanger 120 may be configured to provide the production fluid 12 at an outlet production fluid pressure lower than the inlet production fluid pressure and to provide the working fluid 14 at an outlet working fluid pressure higher than the inlet working fluid pressure.

Optionally, the at least one pressure exchanger 120 includes a plurality of pressure exchangers 120 (FIG. 4) in a network that may be in series, parallel, or a combination of series and parallel.

The power system 10A, 10B, 10C optionally includes at least one heat exchanger 130 fluidly coupled to the at least one pressure exchanger 120 and configured to one of, a) receive from (FIG. 2) and b) provide to (FIGS. 3 and 4), the at least one pressure exchanger 120 the production fluid 12 and the working fluid 14. The heat exchanger 130 may be of any type of heat exchanger, including concurrent flow, counter-flow, shell and tube, and downhole heat exchangers as disclosed in International Patent Application No. PCT/US2022/044736 entitled Downhole Heat Exchanger for Geothermal Power Systems and filed Sep. 26, 2022 and U.S. Provisional Patent Application 63/248,965 for a Downhole Heat Exchanger for Geothermal Power Systems filed Sep. 27, 2021, which are incorporated by this reference. Optionally, the at least one heat exchanger 130 includes a plurality of heat exchangers 130 (FIG. 4) in a network that may be in series, parallel, or a combination of series and parallel.

The heat exchanger 130 may be configured to receive the production fluid 12 at an inlet production fluid temperature and to receive the working fluid 14 at an inlet working fluid temperature. In some instances, the heat exchanger 130 may provide the production fluid 12 at an outlet production fluid temperature lower than the inlet production fluid temperature and to provide the working fluid 14 at an outlet working fluid temperature higher than the inlet working fluid temperature.

Optionally, the pressure exchanger 120 is fluidly upstream of the heat exchanger 130 (FIG. 2) or the pressure exchanger may be fluidly downstream of the heat exchanger 130 (FIG. 3).

As illustrated in FIG. 4, the working fluid 14 may first be introduced into the pressure exchanger 120 and then the heat exchanger 130, while the production fluid 12 may be first introduced into the heat exchanger 130 and then the pressure exchanger 120 to form a pressure/heat exchange network 135. Of course, the pressure/heat exchange network 135 may be organized such that the production fluid 12 and the working fluid 14 first enter a plurality of pressure exchangers 120 in a parallel arrangement and then enter a plurality of heat exchangers 130 in a parallel arrangement akin to that in FIG. 2. Alternatively, the pressure/heat exchange network 130 may be organized such that the production fluid 12 and the working fluid 14 first enter a plurality of heat exchangers 130 in a parallel arrangement and then enter a plurality of pressure exchangers 120 in a parallel arrangement akin to that in FIG. 3.

The power system 10A, 10B, 10C optionally includes at least one boost pump 160 configured to increase at least one of a production fluid pressure and a production fluid flow rate of the production fluid 12. The at least one boost pump 160 may be fluidly coupled to and positioned fluidly upstream from one of the pressure exchanger 120 (FIG. 2) and the heat exchanger 130 (FIGS. 3 and 4). In some examples, the at least one boost pump 160 may be an electric submersible pump positioned in the at least one production well 150.

The at least one boost pump 160 alternatively may be fluidly coupled to and positioned fluidly downstream from one of the pressure exchanger 120 and the heat exchanger 130 (not illustrated). In this instance, the boost pump 160 may be an injection pump configured to at least increase one of an injection fluid pressure and an injection fluid flow rate of the production fluid 12 before reinjecting the production fluid 12 into the geothermal reservoir 36.

The power system 10A, 10B, 10C optionally may be configured to reinject the production fluid 12 back into the geothermal reservoir 36 after the production fluid 12 has passed through the pressure exchanger(s) 120 and/or the heat exchanger(s) 30. Alternatively or additionally, all or a portion of the production fluid 12 may be treated to remove salts or other impurities or otherwise disposed after the production fluid 12 has passed through the pressure exchanger(s) 120 and/or the heat exchanger(s) 130.

The power system 10A, 10B, 10C optionally may include a variety of valves (illustrated, but not labeled) as indicated in FIGS. 2, 3, and 4. The valves may be of any type.

After the pressure and thermal energy of the working fluid 14 has been converted to electricity with the power generating unit 40, the relatively lower pressure and temperature working fluid 14 (as compared to the pressure and the temperature of the working fluid 14 before the power generating unit 40) may be sent to a cooling system (illustrated, but not labeled, akin to cooling system 27 in FIG. 1) in FIGS. 2, 3, and 4. The cooling system may be of any type typically used for cooling a working fluid in a power system.

The power system 10A, 10B, 10C optionally may be configured to at least increase at least a working fluid pressure of the working fluid 14. In this instance a boost pump (not illustrated) such as a compressor may circulate a boost fluid, such as a hydraulic fluid, light weight hydraulic fluid, fresh water, brine (typically greater than 2 parts per thousand of dissolved salt, typically sodium and chloride, but other salts are included in this definition), ammonia, benzene, other hydrocarbons, organic compounds, other liquids, other gases, and the like. Fluid is defined to include both liquids, gases, and supercritical fluids. Optionally, the boost fluid may be supercritical water, supercritical carbon dioxide, supercritical ammonia, and so forth. In this example, the boost fluid may be circulated through at least one separate pressure exchanger like those discussed above. The at least one separate pressure exchanger may be of any type of pressure exchanger as discussed above. The at least one separate pressure exchanger may include a plurality of separate pressure exchangers. The plurality of separate pressure exchangers may be fluidly coupled in a network, such as in series, in parallel, or in a combination of series and parallel.

In this example, a portion or all of the working fluid 14, such as supercritical carbon dioxide or other working fluid, would be diverted from another portion of the working fluid 14 (if the entirety of the working fluid 14 is not diverted) at least one of before or after the working fluid 14 enters or exits the cooling system. (For convenience, "a portion of the working fluid" will mean to encompass both a portion of the working fluid 14 and the entirety of the working fluid 14.) The portion of the working fluid 14 may be diverted through the at least one separate pressure exchanger along with the boost fluid where the at least one separate pressure exchanger decreases the pressure of the boost fluid and increases the working fluid pressure of the portion of the working fluid 14 in a manner as described above. The portion of the working fluid with the now increased working fluid pressure may then be added in whole or in part to the working fluid 14 before the working fluid 14 enters one of the at least one pressure exchanger(s) 120 and/or the at least one heat exchanger(s) 130. Such an arrangement may act as a surge dampener to help reduce any pressure fluctuations in the production fluid 12 that may in turn be reflected in the working fluid 14 after the production fluid 12 transfers its pressure energy to the working fluid in the at least one pressure exchanger 120. In this way, the power generation unit 140 may receive a working fluid pressure of the working fluid 14 that is relatively more stable than would otherwise be the case. Optionally, the compressor may be powered in part or in whole from any hydrocarbons or other source of power (pressure, thermal) produced with the production fluid 12.

A method of converting geopressured and geothermal energy into electricity with a geothermal power system 10A, 10B, and 10C are also disclosed. The method includes producing the production fluid 12 from the at least one production well 150 of any of the examples illustrated in FIGS. 2, 3, and 4. The method further includes introducing the production fluid 12 and the working fluid 14 into at least one pressure exchanger 120 and increasing an inlet working fluid pressure. The method may also include introducing the production fluid 12 and the working fluid 14 into at least one heat exchanger 130 and increasing an inlet working fluid temperature. The method may include introducing the production fluid 12 and the working fluid 14 into the at least one heat exchanger 130 before introducing the production fluid 12 and the working fluid 14 into the at least one pressure exchanger 120. The method may further include introducing the working fluid 14 into the power generation unit 140 and generating electricity with the power generation unit 40. Further, the method of claim may include injecting the production fluid 12 into the geothermal reservoir 36. The method may include increasing at least one of an injection fluid pressure and an injection fluid flow rate of the production fluid 12 before reinjecting the production fluid 12 into the geothermal reservoir 36, which may occur with a boost pump 160 or an injection pump. The method also may include increasing at least one of a production fluid pressure and a production fluid flow rate of the production fluid 12 before introducing the production fluid 12 into the at least one pressure exchanger 120.

Numbered Examples

1. A geopressure and geothermal power system, comprising:
   at least one pressure exchanger configured to receive a production fluid and a working fluid; and,
   at least one heat exchanger fluidly coupled to the at least one pressure exchanger and configured to one of, a) receive from and b) provide to, the at least one pressure exchanger the production fluid and the working fluid.
2. The geopressure and geothermal power system of claim 1, further comprising:
   at least one power generation unit fluidly coupled to one of the at least one pressure exchanger and the at least one heat exchanger; and,
   at least one production well, the at least one production well being positioned at least partially within a geothermal reservoir and configured to provide the production fluid to at least one of the at least one pressure exchanger and the at least one heat exchanger.
3. The geopressure and geothermal power system of claim 1, wherein the at least one pressure exchanger is configured to receive the production fluid at an inlet production fluid pressure and to receive the working fluid at an inlet working fluid pressure.
4. The geopressure and geothermal power system of claim 3, wherein the at least one pressure exchanger is configured to provide the production fluid at an outlet production fluid pressure lower than the inlet production fluid pressure and to provide the working fluid at an outlet working fluid pressure higher than the inlet working fluid pressure.
5. The geopressure and geothermal power system of claim 1, wherein the at least one heat exchanger is configured to receive the production fluid at an inlet production fluid temperature and to receive the working fluid at an inlet working fluid temperature.
6. The geopressure and geothermal power system of claim 5, wherein the at least one heat exchanger is configured to provide the production fluid at an outlet production fluid temperature lower than the inlet production fluid temperature and to provide the working fluid at an outlet working fluid temperature higher than the inlet working fluid temperature.
7. The geopressure and geothermal power system of claim 1, further comprising at least one boost pump configured to increase at least one of a production fluid pressure and a production fluid flow rate of the production fluid.
8. The geopressure and geothermal power system of claim 7, wherein the at least one boost pump is fluidly coupled to and positioned fluidly upstream from one of the at least one pressure exchanger and the at least one heat exchanger.
9. The geopressure and geothermal power system of claim 2, further comprising at least one boost pump configured to increase at least one of a production fluid pressure and a production fluid flow rate of the production fluid.
10. The geopressure and geothermal power system of claim 9, wherein the at least one boost pump is an electric submersible pump positioned in the at least one production well.
11. The geopressure and geothermal power system of claim 1, wherein the at least one pressure exchanger is fluidly upstream of the at least one heat exchanger.
12. The geopressure and geothermal power system of claim 2, wherein the at least one power generation unit includes at least one of an expander, a gearbox, and a generator.
13. The geopressure and geothermal power system of claim 2, wherein the at least one power generation unit is configured to receive the working fluid after the working fluid has passed through the at least one pressure exchanger and the at least one heat exchanger.
14. The geopressure and geothermal power system of claim 2, wherein the production fluid is configured to be reinjected into the geothermal reservoir after the production fluid has passed through at least one of the at least one pressure exchanger and the at least one heat exchanger.
15. The geopressure and geothermal power system of claim 14, further comprising at least one boost pump configured to increase at least one of an injection fluid pressure and an injection fluid flow rate of the production fluid before the production fluid is reinjected into the geothermal reservoir.
16. The geopressure and geothermal power system of claim 1, wherein the at least one pressure exchanger comprises a plurality of pressure exchangers.
17. The geopressure and geothermal power system of claim 1, wherein the at least one heat exchanger comprises a plurality of heat exchangers.
18. The geopressure and geothermal power system of claim 1, wherein the at least one heat exchanger comprises a counter-current heat exchanger.
19. The geopressure and geothermal power system of claim 2, wherein the at least one heat exchanger comprises a downhole heat exchanger.
20. The geopressure and geothermal power system of claim 1, wherein the production fluid is brine.
21. The geopressure and geothermal power system of claim 1, wherein the working fluid is supercritical carbon dioxide.
22. A geopressure and geothermal power system, comprising:
   at least one pressure exchanger configured to receive a production fluid and a working fluid;
   at least one power generation unit fluidly coupled to the at least one pressure exchanger;
   at least one production well, the at least one production well being positioned at least partially within a geothermal reservoir and configured to provide the production fluid to the at least one pressure exchanger.

23. The geopressure and geothermal power system of claim 22, further comprising at least one heat exchanger fluidly coupled to the at least one pressure exchanger and configured to one of, a) receive from and b) provide to, the at least one pressure exchanger the production fluid and the working fluid.

24. A method of converting geopressured and geothermal energy into electricity with a geothermal power system, comprising:
    producing the production fluid from the at least one production well of claim 2;
    introducing the production fluid and the working fluid into the at least one pressure exchanger; and,
    increasing an inlet working fluid pressure of the working fluid.

25. The method of claim 24, further comprising:
    introducing the production fluid and the working fluid into the at least one heat exchanger and,
    increasing an inlet working fluid temperature of the working fluid.

26. The method of claim 25, wherein introducing the production fluid and the working fluid into the at least one heat exchanger occurs before introducing the production fluid and the working fluid into the at least one pressure exchanger.

27. The method of claim 24, further comprising
    introducing the working fluid into the at least one power generation unit; and,
    generating electricity with the at least one power generation unit.

28. The method of claim 24, further comprising reinjecting the production fluid into the geothermal reservoir.

29. The method of claim 28, further comprising increasing at least one of an injection fluid pressure and an injection fluid flow rate of the production fluid before reinjecting the production fluid into the geothermal reservoir.

30. The method of claim 24, further comprising increasing at least one of a production fluid pressure and a production fluid flow rate of the production fluid before introducing the production fluid into the at least one pressure exchanger.

The one or more present inventions, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure.

The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A geopressure and geothermal power system, comprising:
    at least one pressure exchanger configured to receive a production fluid and a working fluid; and,
    at least one heat exchanger fluidly coupled to the at least one pressure exchanger and configured to one of, a) receive from and b) provide to, the at least one pressure exchanger the production fluid and the working fluid.

2. The geopressure and geothermal power system of claim 1, further comprising:
    at least one power generation unit fluidly coupled to one of the at least one pressure exchanger and the at least one heat exchanger; and,
    at least one production well, the at least one production well being positioned at least partially within a geothermal reservoir and configured to provide the production fluid to at least one of the at least one pressure exchanger and the at least one heat exchanger.

3. The geopressure and geothermal power system of claim 1, wherein the at least one pressure exchanger is configured to receive the production fluid at an inlet production fluid pressure and to receive the working fluid at an inlet working fluid pressure.

4. The geopressure and geothermal power system of claim 3, wherein the at least one pressure exchanger is configured to provide the production fluid at an outlet production fluid pressure lower than the inlet production fluid pressure and to provide the working fluid at an outlet working fluid pressure higher than the inlet working fluid pressure.

5. The geopressure and geothermal power system of claim 1, wherein the at least one heat exchanger is configured to receive the production fluid at an inlet production fluid temperature and to receive the working fluid at an inlet working fluid temperature.

6. The geopressure and geothermal power system of claim 5, wherein the at least one heat exchanger is configured to provide the production fluid at an outlet production fluid temperature lower than the inlet production fluid temperature and to provide the working fluid at an outlet working fluid temperature higher than the inlet working fluid temperature.

7. A geopressure and geothermal power system, comprising:
    at least one pressure exchanger configured to receive a production fluid and a working fluid;
    at least one power generation unit fluidly coupled to the at least one pressure exchanger; and,
    at least one production well, the at least one production well being positioned at least partially within a geothermal reservoir and configured to provide the production fluid to the at least one pressure exchanger.

8. The geopressure and geothermal power system of claim 7, further comprising at least one heat exchanger fluidly coupled to the at least one pressure exchanger and configured to one of, a) receive from and b) provide to, the at least one pressure exchanger the production fluid and the working fluid.

9. A method of converting geopressured and geothermal energy into electricity with a geothermal power system, comprising:
   producing the production fluid from the at least one production well of claim 2;
   introducing the production fluid and the working fluid into the at least one pressure exchanger; and,
   increasing an inlet working fluid pressure of the working fluid.

10. The method of claim 9, further comprising:
    introducing the production fluid and the working fluid into the at least one heat exchanger; and,
    increasing an inlet working fluid temperature of the working fluid.

11. The method of claim 10, wherein introducing the production fluid and the working fluid into the at least one heat exchanger occurs before introducing the production fluid and the working fluid into the at least one pressure exchanger.

12. The method of claim 9, further comprising:
    introducing the working fluid into the at least one power generation unit; and,
    generating electricity with the at least one power generation unit.

13. The method of claim 9, further comprising reinjecting the production fluid into the geothermal reservoir.

14. The method of claim 13, further comprising increasing at least one of an injection fluid pressure and an injection fluid flow rate of the production fluid before reinjecting the production fluid into the geothermal reservoir.

15. The method of claim 9, further comprising increasing at least one of a production fluid pressure and a production fluid flow rate of the production fluid before introducing the production fluid into the at least one pressure exchanger.

* * * * *